Patented Mar. 19, 1940

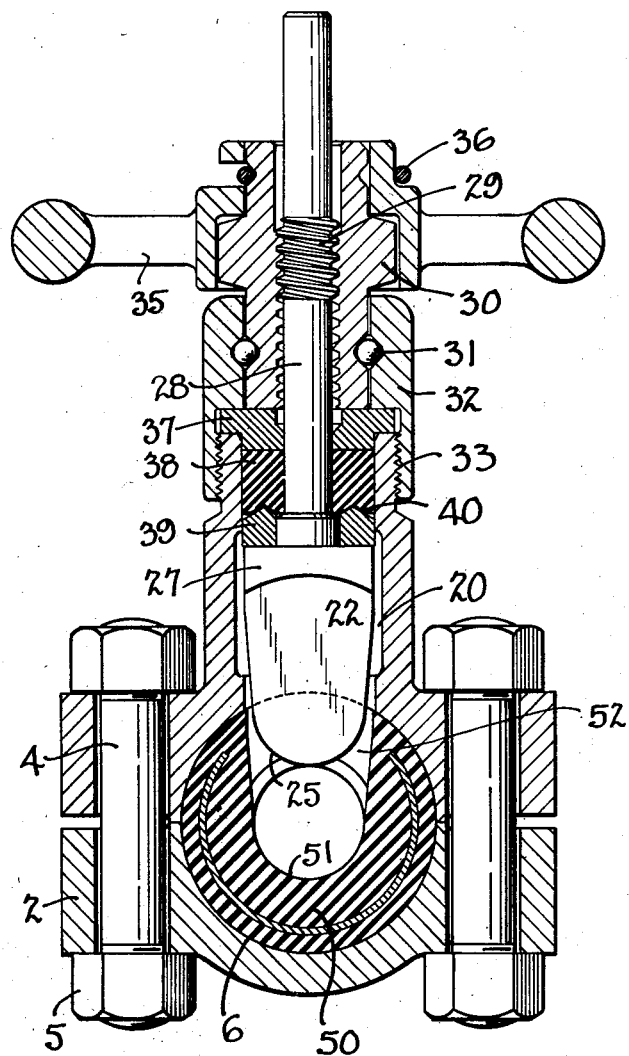

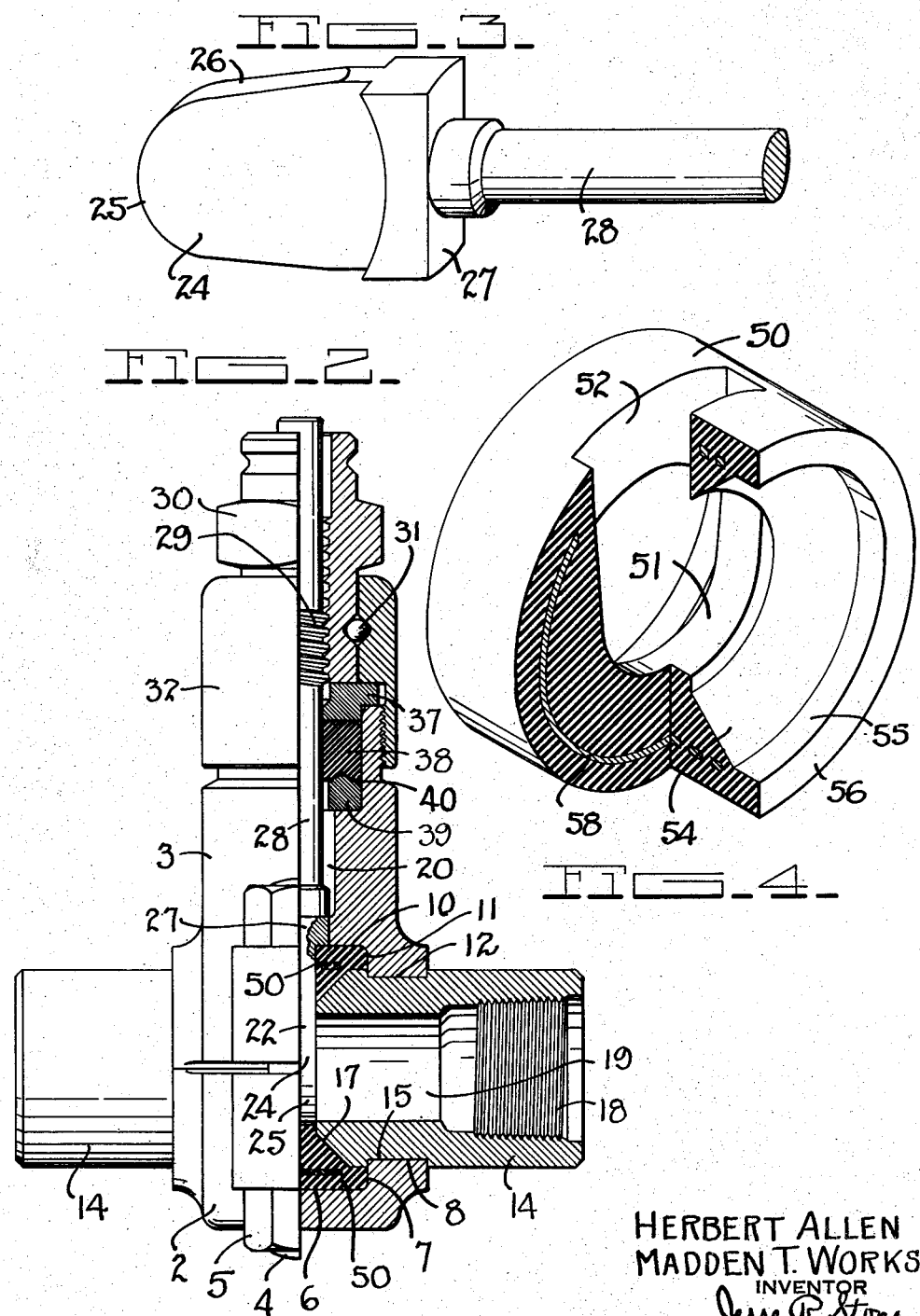

2,194,262

UNITED STATES PATENT OFFICE 2,194,262

SPLIT HOUSING MANIFOLD VALVE

Herbert Allen and Madden T. Works, Houston, Tex., assignors to Cameron Iron Works, a corporation Application July 2, 1937, Serial No. 151,734

12 Claims. (Cl. 251—167)

The invention relates to a valve of the manifold type which is particularly adapted to withstand high pressures and maintain a seal at all times in a manner such that the valve seat will not become worn, distorted or corroded.

It is one of the objects of the invention to provide a valve having a split housing wherein a valve seat of resilient material is clamped in position when the two parts of the valve housing are affixed together.

Another object of the invention is to provide a valve wherein the pressure due to the closing of the valve member will cause the valve seat to flow under pressure and to form a seal not only with the valve member but with the valve body as well.

Still another object of the invention is to provide a resilient valve seat member which will flow under pressure so as to form a seal with all of the surfaces of the valve and the valve member.

Still another object of the invention is to provide a valve packing which can flow to seal all of the joints in the valve when the pressure of the gate member is applied thereto.

Still another object of the invention is to provide a valve packing having opening therein into which the valve member will move in order to expand the packing and effect a seal with both the gate and the valve body.

Still another object of the invention is to provide a split valve housing which will clamp the packing and the valve fittings in sealing position.

Another object is to provide a seal about the valve stem when the valve is open.

Other and further objects of the invention will be readily apparent when the following description is considered in connection with the accompanying drawings, wherein:

Fig. 1 is a vertical sectional view transversely of the valve member and illustrating the arrangement of the parts with the valve in open position.

Fig. 2 is a side elevation partly in section and illustrating a longitudinal sectional view of the parts.

Fig. 3 is a perspective view of the valve or gate member.

Fig. 4 is a perspective view of the packing with certain parts cut away to illustrate the construction thereof.

In Fig. 1 the valve housing is made up of a base member 2 and the valve body 3. These two parts are arranged to be clamped together by the bolts 4 and drawn into close fitting relationship by the nuts 5 on the bolts.

The base 2 is formed with a recess 6, which is substantially semi-circular and, as seen in Fig. 2, is provided with a shoulder 7 adjacent the ends thereof, and beyond which the recess is reduced in diameter to form the neck portion 8.

The body portion 3 is formed with a similar recess 10, shoulder 11, and neck portion 12. The nipple or fitting 14 is of a configuration to be received between the necks 8 and 12 due to the fact that it has a reduced area 15 thereon and the tapered end 17 is arranged to project into the recess formed between the base and the body. The outer end of this nipple 14 may be threaded at 18.

The body 3 is formed with a chamber 20 which merges with the recess 10 and extends upwardly away from the transverse passage through the valve.

The valve or gate member 22 is arranged for sliding movement in this chamber and is adapted to move downwardly into the recess provided by the base and the body. This gate member is of peculiar construction as clearly seen in Fig. 3 in that it has a spade portion 24 which has a lower rounded end 25 and the side faces 26. This part of the member is surmounted by the head 27 and the stem 28. As seen in Fig. 1, the stem may be threaded at 29 and is of the rising stem type in that it is received in the rotatable bushing 30. This bushing is mounted in anti-friction bearings 31 in the bonnet 32, which is threaded on the valve body at 33. A suitable handle 35 is connected by the member 36 to the bushing so that rotation may be imparted to the bushing in order to move the valve member into closed or open position.

A sealing assembly is provided by the body 3 and the cap 32 by means of the support plate 37, the packing 38, and the expander ring 39. This last ring is carried on the head 27 and is provided with the upwardly facing wedge portion 40 so that it will tend to expand the packing 38 when the valve member is moved to open position. In this manner a seal may be formed about the periphery of the stem 28 and against the inside of the valve body 3. When, however, the gate member is moved downwardly the wedge ring 39 will be removed and the packing can release slightly from the stem to facilitate its movement.

The main packing body which is to be used in the valve is seen in perspective view in Fig. 4 and comprises a body 50 of resilient material such as rubber or other suitable composition which is of a resilient consistency such that it will flow under pressure and in this manner adapt itself to the configuration of the inside of the valve and the gate member.

This body 50 has an opening 51 therethrough which is of a suitable diameter to correspond with the passage 19 through the fitting 14 so that there will be an opening of uniform size through the valve packing and fitting. It will be observed that this body is of substantial size so that there will be sufficient resilient material present to flow under pressure of the gate member. In order that the gate member may move into position to close the opening 51 a side opening 52 has been provided through the side of the body and is of the same cross sectional configuration as the spade 24 of the valve member, or it may be of slightly less size.

Longitudinally of the packing 50 on each side of the opening 51 is a beveled face 54, which is arranged to engage the beveled face 17 on the end of each of the nipples 14. Beyond this beveled face 54 is a cylindrical area 55 which will engage the periphery of the nipple adjacent the shoulders 7 and 11, and the end face 56 is arranged to abut the shoulders 7 and 11. A suitable reenforcing material 58 may be disposed within the body 50 if desired.

In practice the valve will be assembled by positioning the nipples and the packing together and inserting them into either the recess 6 in the base or the recess 10 in the valve and then the other member passed into position thereover so that the recesses 6 and 10 will confine the packing and the nipples as seen in Fig. 2. The bolts 4 can then be positioned and the nuts 5 turned up so that the packing will be firmly clamped in position to force the faces of the packing against the faces of the recesses 6 and 10, and against the shoulders 7 and 11 and the ends 17 of the nipples. This clamping action holds the resilient packing firmly in position. When the valve is to be closed the handle 35 will be manipulated to move this gate member downwardly through the opening 52 so that the faces 25 and 26 will abut against the periphery of the opening 51. Any desired amount of pressure may then be applied by further turning of the handle so as to force the gate member securely against the packing. One of the essential features of the invention is the resiliency of this packing so that this pressure applied by the gate member will be transmitted throughout the packing due to its ability to flow slightly under pressure.

In this manner an equal pressure to effect a sealing action will be applied against all of the surfaces which are contacted by the packing including those of the recess on the base and the valve, as well as on the fittings 14 and against the surfaces of the gate member. In view of the fact that the pressure is equalized on all surfaces there will be no tendency to leak at one point more than another and if there is any wearing away of the gate member or the packing at any point the application of pressure will tend to cause the packing to flow into this worn area and compensate therefor, the result being that a much better seal may be obtained and any slight variation in the construction, arrangement or assembly of the parts will be compensated for by the flowing of the packing material into position and a uniform and satisfactory seal will be obtained.

What is claimed is:

1. A split housing manifold valve comprising a valve base having a recess therein, a valve body having a recess therein, a chamber in said body connecting with said recess, means to clamp said base and body together so that said recesses form an annular passage transversely of the valve, a body of resilient material disposed in said recesses and clamped in said passage by said means so as to form a seal with the walls of the recesses, an opening through said resilient body for the passage of fluid, another opening in said resilient body which joins said first opening transversely thereof, a tapered valve member in said chamber and movable into said last opening and across said first opening to close said valve, and means to force said member against said resilient body so that the pressure thus applied will flow the resilient body in all directions to form seals between all of the surfaces of said base, body and valve member.

2. A split housing valve comprising a base, a body, cooperating portions thereon to form a neck at each end of the valve, a valve fitting confined by each neck, a resilient packing body clamped in sealing position by said base, body, and fittings, and a gate member to move into said packing to create additional sealing pressure.

3. A valve comprising a housing and a gate member, said housing including two parts, means to clamp said parts together, a packing member disposed between said parts and held in position by said means, said member being of a resilient material and substantially cylindrical with a passage axially thereof and an opening transversely through the side to admit said gate to close said passage.

4. A valve including a pair of recessed members, a resilient packing arranged to fit said recesses, a passage through said packing, an opening transversely of the packing between the ends thereof and joining said passage, and a valve member movable into said opening to close said passage and apply pressure to said packing so as to form a seal with said member and said parts.

5. In a valve of the character described a body, a cap therefor, a plate between said body and cap, a resilient seal ring and a wedge member below said plate, a valve member having a head, a stem thereon projecting through said cap, plate, ring and wedge, a head on said valve to abut said wedge to expand said ring in sealing position within said body and against said stem upon opening of said valve member.

6. A packing ring for valves comprising a body of resilient material, a longitudinal passage therethrough for a flow of fluid, faces within said packing at each end of said passage, and a cylindrical area beyond each face.

7. A packing ring for valves comprising a body of resilient material, a longitudinal passage therethrough for a flow of fluid, faces within said packing at each end of said passage, a cylindrical area beyond each face, and a transverse opening through the side of said body and connecting into said passage whereby a gate member may move into said body to close said passage.

8. In a gate valve of the character described a housing, a resilient packing therein, an end nipple projecting into each end of said packing, and a gate member movable to engage said packing so as to apply pressure thereto to effect sealing with the gate member, nipples and housing.

9. In a gate valve of the character described a gate having a rectangular cross section, an annular packing, an opening in the side of said packing to receive said gate, and cooperating surfaces on said packing and gate so that said packing is distorted to sealing position.

10. A valve comprising a two part housing, means to connect said parts, a substantially semicircular recess in each part, and a rubber packing body of a substantially circular configuration to fill said recesses and be clamped in said recesses when said parts are connected.

11. A valve comprising a two part housing, means to connect said parts, a substantially semicircular recess in each part, a rubber packing body of a configuration to be clamped in said recesses when said parts are connected, and a gate member to enter said packing and apply pressure to said packing body to form a seal with said parts and all the faces of said gate member.

12. In a gate valve, a body, a gate member, a resilient packing completely confined by said body except for cooperating faces to completely surround said gate member in closed position, a passage through said packing, and means to move said gate member against said faces to close said passage and apply pressure to said packing to form a seal with said gate member and said body so as to set up in the confined packing a unit area pressure greater than the pressure through said valve.

HERBERT ALLEN.
MADDEN T. WORKS.